United States Patent
Stoddart et al.

(10) Patent No.: US 11,756,034 B2
(45) Date of Patent: Sep. 12, 2023

(54) SYSTEMS AND METHODS FOR ALTERNATIVE PAYMENT MECHANISM PAYMENTS USING ULTRA-WIDEBAND RADIO TECHNOLOGY

(71) Applicant: VeriFone, Inc., Wilmington, DE (US)

(72) Inventors: Ian Matthew Stoddart, Leeds (GB); Andres Castillo, Baildon (GB)

(73) Assignee: VeriFone, Inc., Wilmington, DE (US)

( * ) Notice: Subject to any disclaimer, the term of this patent is extended or adjusted under 35 U.S.C. 154(b) by 0 days.

(21) Appl. No.: 17/359,179

(22) Filed: Jun. 25, 2021

(65) Prior Publication Data

US 2022/0414658 A1    Dec. 29, 2022

(51) Int. Cl.
*G06Q 20/40* (2012.01)
*G06Q 20/32* (2012.01)
*H04W 12/03* (2021.01)
*H04B 1/7163* (2011.01)

(52) U.S. Cl.
CPC ..... *G06Q 20/4014* (2013.01); *G06Q 20/3224* (2013.01); *H04W 12/03* (2021.01); *G06Q 20/3276* (2013.01); *H04B 1/7163* (2013.01)

(58) Field of Classification Search
None
See application file for complete search history.

(56) References Cited

U.S. PATENT DOCUMENTS

| | | | |
|---|---|---|---|
| 7,475,808 B1 * | 1/2009 | Bishop | G06Q 20/40 235/379 |
| 10,007,915 B2 * | 6/2018 | Singh | G06Q 30/02 |
| 11,144,901 B1 * | 10/2021 | Dennis | G06Q 20/227 |

(Continued)

FOREIGN PATENT DOCUMENTS

| | | |
|---|---|---|
| JP | 2020532207 A | 11/2020 |
| WO | WO-2022133356 A1 * | 6/2022 |

OTHER PUBLICATIONS

VISA, "Verified by VISA Acquirer and Merchant Implementation Guide, US Region"; May 2011 (Year: 2011).*

(Continued)

*Primary Examiner* — Daniel S Felten
*Assistant Examiner* — Claire A Rutiser
(74) *Attorney, Agent, or Firm* — Bond, Schoeneck & King, PLLC (57) ABSTRACT

Systems and methods for alternative payment mechanism payments using ultra-wideband radio technology are disclosed. A method may include a payment terminal computer program executed by a payment terminal selecting a customer electronic device that is conducting the payment transaction with the payment terminal; communicating, via a payment terminal UWB radio to the selected customer electronic device, payment transaction details for the payment transaction comprising a merchant identifier and a transaction amount; receiving, from the selected customer electronic device via the payment terminal UWB radio, an APM payment message for an APM payment provider; communicating the APM payment message to the APM payment provider, wherein the APM payment provider is configured to decision the transaction based on the APM payment message; and receiving, from the APM payment provider, a payment confirmation for the payment transaction.

10 Claims, 5 Drawing Sheets

(56) References Cited

U.S. PATENT DOCUMENTS

| | | | |
|---|---|---|---|
| 2007/0086389 A1 | 4/2007 | Park et al. | |
| 2010/0280940 A1* | 11/2010 | Roberts | G06Q 20/32 |
| | | | 455/406 |
| 2011/0228820 A1 | 9/2011 | De Rosa | |
| 2014/0052616 A1 | 2/2014 | Choi et al. | |
| 2014/0058865 A1* | 2/2014 | Yang | G06Q 20/382 |
| | | | 705/44 |
| 2014/0058941 A1* | 2/2014 | Moon | G06Q 20/18 |
| | | | 705/42 |
| 2014/0149859 A1* | 5/2014 | Van Dyken | G06F 3/017 |
| | | | 715/702 |
| 2014/0222599 A1* | 8/2014 | Wang | H04L 51/222 |
| | | | 705/39 |
| 2015/0347989 A1* | 12/2015 | Kumar S | G06Q 20/027 |
| | | | 705/44 |
| 2016/0012465 A1* | 1/2016 | Sharp | G06Q 20/321 |
| | | | 705/14.17 |
| 2017/0280392 A1* | 9/2017 | Segev | H04W 52/0235 |
| 2018/0049003 A1* | 2/2018 | Maulsby | G06Q 30/0224 |
| 2019/0087810 A1* | 3/2019 | Dopkeen | G06Q 20/3278 |
| 2021/0312424 A1* | 10/2021 | Lee | G06Q 20/20 |

OTHER PUBLICATIONS

VISA, "Verified by Visa, Acquirer and Merchant Implementation Guide, US Region", dated May 2011. (Year: 2021) (Year: 2011).*
International Search Report and the Written Opinion of the International Searching Authority, International Patent Application No. PCT/US22/73106, dated Sep. 12, 2022, pp. 1-9.

* cited by examiner

SYSTEMS AND METHODS FOR ALTERNATIVE PAYMENT MECHANISM PAYMENTS USING ULTRA-WIDEBAND RADIO TECHNOLOGY

BACKGROUND OF THE INVENTION

1. Field of the Invention

The present disclosure relates generally to systems and methods for alternative payment mechanism payments using ultra-wideband radio technology.

2. Description of the Related Art

When a customer seeks to make a payment using an alternative payment mechanism (APM), such as PAYPAL, VENMO, ALIPAY, WECHAT, KLARNA, etc., an application provided by the APM provider typically reads a Quick Response (QR) code displayed by a merchant payment terminal. The QR code may include a merchant identifier, a terminal identifier, and transaction information. The APM provider application then communicates this information, with customer information, to the APM provider, which decisions the transaction and returns the decision to the payment terminal that was identified in the QR code.

Alternatively, the APM provider application on the customer electronic device may generate a QR code, which includes customer information, that may be presented to the merchant payment terminal. The merchant payment terminal then sends the information in the QR code, along with merchant information and transaction data, to the APM provider, which decisions the transaction and sends confirmation of the transaction to the APM provider application on the customer's electronic device.

In either case, the customer electronic device needs an Internet connection to conduct the transaction, or to receive confirmation after the transaction has been completed. If the customer is roaming, it may not be possible for the customer electronic device to have a data connection.

SUMMARY OF THE INVENTION

Systems and methods for alternative payment mechanism payments using ultra-wideband radio technology are disclosed. In one embodiment, a method for facilitating an APM payment transaction using ultra-wideband UWB radio technology may include: (1) selecting, by a payment terminal computer program executed by a processor of a payment terminal, a customer electronic device from a plurality of customer electronic devices, wherein the selected customer electronic device is conducting the payment transaction with the payment terminal; (2) communicating, by the payment terminal computer program via a payment terminal UWB radio, to the selected customer electronic device, payment transaction details for the payment transaction, the payment transaction details comprising a merchant identifier and a transaction amount; (3) receiving, by the payment terminal computer program and from the selected customer electronic device via the payment terminal UWB radio, an APM payment message for an APM payment provider; (4) communicating, by the payment terminal computer program, the APM payment message to the APM payment provider, wherein the APM payment provider is configured to decision the transaction based on the APM payment message; and (5) receiving, by the payment terminal computer program and from the APM payment provider, a payment confirmation for the payment transaction.

In one embodiment, the step of selecting, by the payment terminal computer program executed by a processor of a payment terminal, the customer electronic device may include: causing, by the payment terminal computer program, the payment terminal UWB radio to transmit a range request signal from a first antenna; receiving, by the payment terminal computer program and from each of one or more customer electronic devices comprising customer electronic device UWB radios, a pair of replies to the range request signal, the pair of replies comprising a first reply signal received at the first antenna and a second reply signal received at a second antenna; and determining, by the payment terminal computer program, a distance between the payment terminal UWB radio and each customer electronic device based on a time of flight for the range request signal and the pair of reply signals. The selected customer electronic device has the distance that is closest to the payment terminal UWB radio.

In one embodiment, the method may further include causing, by the payment terminal computer program, a wake-up signal to be transmitted, wherein the wake-up signal causes the customer electronic device UWB radios on the one or more customer electronic devices to be activated.

In one embodiment, the method may further include determining, by the payment terminal computer program, that the selected customer electronic device is within a predetermined distance of the payment terminal UWB radio.

In one embodiment, the method may further include communicating, by the payment terminal computer program and using the payment terminal UWB radio, the transaction confirmation to the selected customer electronic device.

In one embodiment, the APM payment message may be encrypted and may include the payment transaction details and an APM customer identifier. In one embodiment, the encrypted APM payment message may be received with an identifier for the APM payment provider.

In one embodiment, the identifier for the APM payment provider may be in a message header.

According to another embodiment, a payment terminal device may include a memory comprising a payment terminal computer program; a processor configured to execute the payment terminal computer program; and a payment terminal device ultra-wideband ("UWB") radio comprising a plurality of antennas. The payment terminal computer program may be configured to: select a customer electronic device from one or more customer electronic devices, the selected customer electronic device being identified as conducting a transaction with the payment terminal device; communicate payment transaction details for the transaction comprising a merchant identifier and transaction information to the selected customer electronic device using the payment terminal device UWB radio; receive an Alternate Payment Mechanism ("APM") payment message from the selected customer electronic device for an APM payment provider; communicate the APM payment message to the APM payment provider, wherein the APM payment provider may be configured to decision the transaction based on the APM payment message; and receive a transaction confirmation from the APM payment provider.

In one embodiment, the payment terminal computer program may be further configured to: cause the payment terminal device UWB radio to transmit a range request signal from a first antenna; receive from each of the one or more customer electronic devices, each customer electronic device comprising a customer electronic device UWB radio, a pair of replies to the range request signal, the pair of replies comprising a first reply signal received at the first antenna and a second reply signal received at a second antenna; and determine a distance between the payment terminal device UWB radio and each customer electronic devices based on a time of flight for the range request signal and the pair of reply signals. The selected customer device has the distance that is closest to the payment terminal device UWB radio.

In one embodiment, the payment terminal computer program may be further configured to cause a wake-up signal to be transmitted, wherein the wake-up signal causes the customer electronic device UWB radios on the one or more customer electronic devices to be activated.

In one embodiment, the payment terminal computer program may be further configured to determine that the selected customer electronic device is within a predetermined distance of the payment terminal device UWB radio.

In one embodiment, the payment terminal computer program may be further configured to communicate the transaction confirmation to the selected customer electronic device using the payment terminal device UWB radio.

In one embodiment, the APM payment message may be encrypted and may include the payment transaction details and an APM customer identifier. In one embodiment, the encrypted APM payment message may be received with an identifier for the APM payment provider.

In one embodiment, the identifier for the APM payment provider may be in a message header.

According to another embodiment, an electronic device may include a memory; a computer processor; and an electronic device ultra-wideband ("UWB") radio. The electronic device may be configured to: receive, by the electronic device UWB radio and from a payment terminal, a range request signal; communicate, by the electronic device UWB radio, a reply to the payment terminal in response to receiving the range request signal; receive, by the electronic device UWB radio, transaction details for a transaction comprising a merchant identifier and transaction information; communicate, by the electronic device UWB radio, an encrypted Alternate Payment Mechanism ("APM") payment message for an APM provider, wherein the APM payment provider may be configured to decrypt the encrypted APM payment message and decision the transaction based on the APM payment message; and receive a transaction confirmation from the APM provider.

In one embodiment, the encrypted APM payment message may include the transaction details and an APM customer identifier.

In one embodiment, the electronic device may be further configured to communicate an identifier for the APM provider with the encrypted APM payment message.

In one embodiment, the identifier may be in a message header.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and for APM payments using ultra-wideband radio technology.

Figure 1:
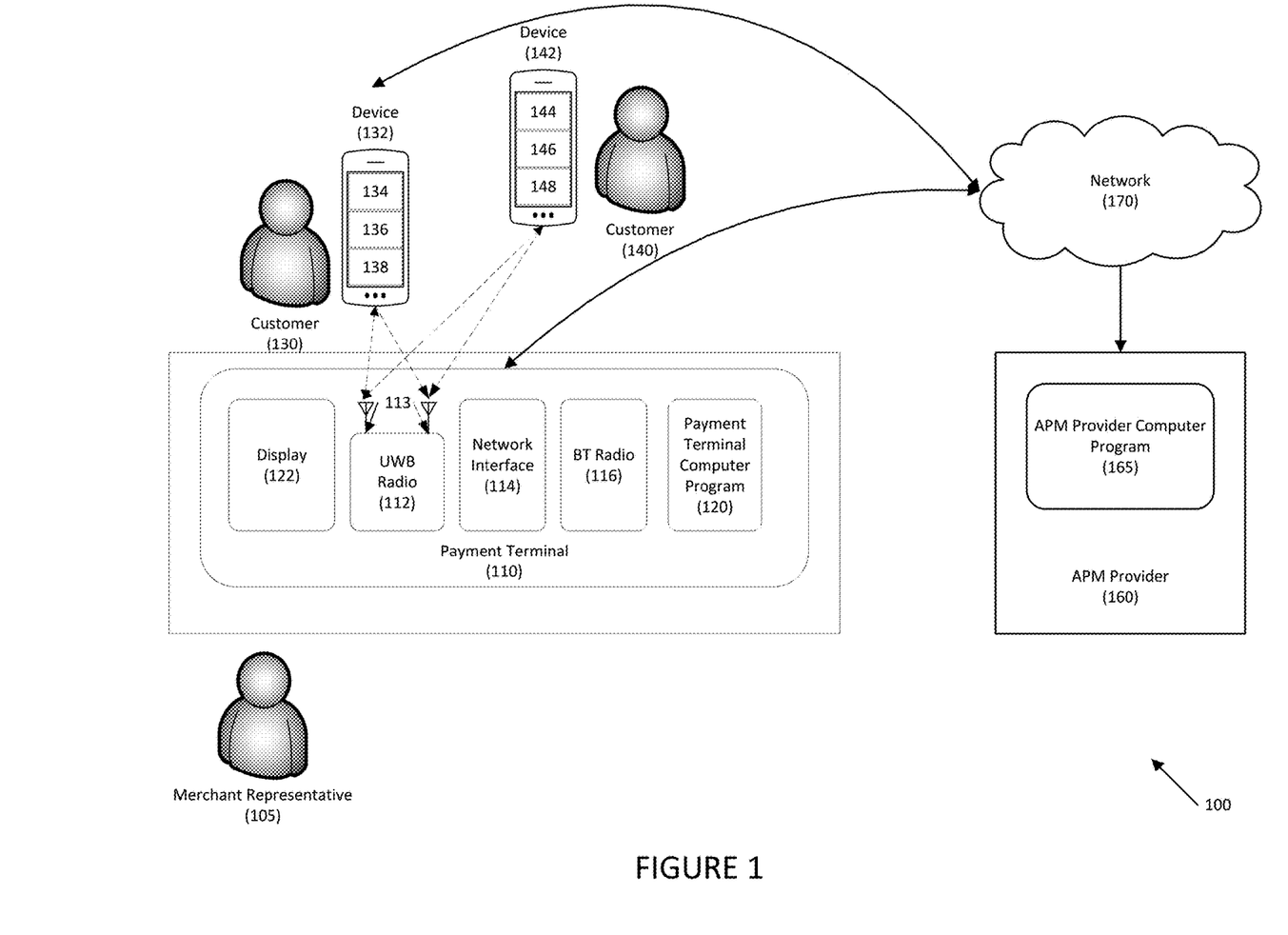
FIG. 1 depicts a system for APM payments using ultra-wideband radio technology according to one embodiment.

Referring to FIG. 1, a system for APM payments using ultra-wideband radio technology is disclosed according to one embodiment. System 100 may include a merchant system, including, for example, payment terminal 110. Payment terminal 110 may be operated by merchant representative 105, who may be an employee of the merchant.

Payment terminal 110 may be any suitable point of transaction device with which any of customers 130, 140 may conduct a transaction. Payment terminal 110 may include display 122, which may be any suitable display that may display instructions to a customer. During a transaction, a customer and the customer's electronic device (e.g., customer electronic device 132) will likely be located in proximity to display 122.

Payment terminal computer program 120 may be a computer program or application that is executed by a computer processor (not shown) in payment terminal 110. For example, payment terminal computer program 120 may control the operation of UWB radio 112 and network interface 114. For example, payment terminal computer program 120 may control UWB radio 112 to communicate with other UWB radios, such as UWB radios 136, 146 in customer electronic devices 132, 142, and may control network interface 114, such as a WiFi radio, a cellular radio, or any other suitable network connection, to communicate over network 170. Payment terminal computer program 120 may further control display 122 to display instructions. Payment terminal computer program 120 may further control other operations of payment terminal 110 as is necessary and/or desired.

Customer electronic devices 132 and 142 may each be associated with customers 130 and 140, respectively. Customer electronic devices 132, 142 may be any suitable electronic device, including smartphones, smart watches, Internet of Things (IoT) appliances, etc. Customer electronic devices 132, 142 may execute one or more mobile application 134, 144, such as one or more APM provider applications, and a customer electronic device computer program 138, 148, such as an operating system. Customer electronic devices 132 and 142 may each include UWB radios 136 and 146, respectively.

Payment terminal 110 may include UWB radio 112 that may include a plurality of antennas 113. One antenna 113 may be used to transmit UWB signals to one or more UWB radios 136, 146 on customer electronic devices 132, 142, respectively, and both antennas 113 may receive signals from one or more UWB radios 136, 146 on customer electronic devices 132, 142, respectively. FIG. 1 depicts two antennas 113; additional antennas 113 may be used as is necessary and/or desired.

APM provider 160 may provide a non-traditional mode of payment (i.e., an alternate payment mechanism) where exchange of a payment instrument is not required. The payment instrument may be, for example, a credit card, debit card, a token for a credit or debit card, cash, check, money order, draft, and/or other types of payment instruments. Examples APM providers 160 include PAYPAL, VENMO, ALIPAY, WECHAT, KLARNA, etc. APM provider 160 may provide APM provider computer program 165 that may interface with customer electronic device 132, 142 and/or payment terminal 110 via network 170. APM provider 160 may receive an APM payment method from customer electronic device 132, 142 and/or payment terminal 110, and may decision the transaction based on the contents of APM payment message. Each APM provider 160 may have its own definition of the information that is to be included in the APM payment message, such as details about the transaction, the merchant, the customer, etc. The contents of the APM message may also be used by APM provider 160 to match the customer to the merchant and the transaction.

In one embodiment, APM provider 160 may facilitate interfacing with the customer electronic device 132, 142 and/or payment terminal via a browser. Network 170 may be any suitable communication network, or combinations of communication networks. Examples include cellular networks, WiFi networks, local area networks, the Internet, etc.

In one embodiment, at any point in the transaction, such as when payment is due, payment terminal computer program 120 may cause display 122 to display an instruction, such as "Hold your electronic device out to conduct a transaction using your alternative payment provider." By using this message, the likelihood that the customer electronic device is the correct customer electronic device is increased.

To identify which of the customers 130 and 140 is conducting the transaction, their exact location relative to the payment terminal 110 is determined via the UWB radio 112 of the payment terminal 110. For example, responses from UWB radios 136, 146 of the customer electronic devices 132, 142 to a beaconing signal transmitted by the UWB radio 112 may be analyzed to accurately identify the correct customer to conduct the transaction. Features of the response signal, such as angle or arrival, time of flight, strength of signal, etc. help determine the correct customer. A minimum of two antennas 113 may be required to determine the angle of arrival, as the angle of arrival is calculated from either the time or phase difference between the same signal received at each of the antennas 113. With two antennas 113, however, there may be uncertainty with regard to which side of antennas 113 any of customer devices 132, 142, are located, and the positioning of antennas 113 and payment terminal 110 may be used to assist in determining the side (e.g., antennas 113 may be positioned so that it is physically impossible for a customer electronic device to be on one side of the antennas 113). With three antennas 113, the positioning of any of customer devices 132, 142 is absolute with no uncertainty as to which side of the antennas 113 the customer electronic device is located.

Using UWB radio 112, payment terminal computer program 120 may identify a distance between antennas 113 and one or more of UWB radios 136, 146 on customer electronic devices 132, 142, respectively. In one embodiment, payment terminal computer program 120 may cause UWB radio 112 to transmit a range request signal (e.g., a signal containing a range request packet) from at least one of antennas 113, and both antennas 113 may receive a reply signal from one or more UWB radios 136, 146. Payment terminal computer program 120 may then use the times of flight for the range request signal and each reply signal for each antenna 113 to determine the distance between one or more of customer electronic devices 132, 142, and UWB radio 112.

In one embodiment, payment terminal computer program 120 may also use the angles of arrival of each reply signal to determine which side of UWB radio 112 (e.g., the customer side or the merchant side) each customer electronic device 132, 142, is located. Examples of protocols for using UWB ranging are disclosed in E. Karapistoli et al. "An overview of the IEEE 802.15.4a Standard," in *IEEE Communications Magazine*, vol. 48, no. 1, pp. 47-53 (January 2010), the disclosure of which is hereby incorporated, by reference, in its entirety.

In one embodiment, payment terminal computer program 120 may compare the determined locations for the one or more of customer electronic devices 132 and 142 to a predetermined distance from UWB radio 112, for example within 12 inches from UWB radio 112. The predetermined distance may be set as is necessary and/or desired based on the configuration of the customer area, payment terminal 110, etc. In another embodiment, payment terminal computer program 120 may compare the determined locations to an expected customer position in front of payment terminal 110, such as within 12 inches of payment terminal 110 or display 122. Based on the comparison, payment terminal computer program 120 may determine the customer electronic device, such as customer electronic device 132, that is likely to be conducting the transaction. In another embodiment, payment terminal computer program 120 may select the customer electronic device that is closest to payment terminal 110, such as customer electronic device 132.

In one embodiment, in order to be identified by UWB radio 112, customer electronic devices 132, 142 may be required to have their respective UWB radios 136, 146 turned on, listening, or otherwise configured to communicate by UWB. In one embodiment, BT radio 116 or a separate radio (not shown) may communicate a signal (e.g., a RF signal) that may result in UWB radios 136, 146 on customer electronic devices 132, 142, turning on or otherwise becoming active. For example, BT radio 116 may emit a BLE signal, such as a beacon frame, that may be received by a radio (e.g., a Bluetooth radio) on device 132, 142 (not shown) that may cause the operating system on customer electronic devices 132, 142 to turn on or otherwise activate its UWB radios 136, 146. In one embodiment, payment terminal computer program 120 may control BT radio 116 to be active during a transaction with a customer, and inactive otherwise. In another embodiment, UWB radio 112 may send the beacon frame that may also result in UWB radios 136, 146 on customer electronic devices 132, 142 to turn on or otherwise become active.

Payment terminal computer program 120 may further control UWB radio 112 to communicate transaction details to UWB radio 136, 146 of the customer electronic device 132, 142 that is closest to payment terminal 110, such as customer electronic device 132. In one embodiment, the transaction details may be provided in a code, such as a QR code, and may include a merchant identifier, a payment terminal identifier, a transaction amount, etc. As noted above, the contents of the code may vary by APM provider 160, and the contents of the code may be used by APM provider 160 to match the customer to the merchant and the transaction.

Payment terminal computer program 120 may further control UWB radio 112 to receive an APM-specific payment message from UWB radio 136, 146 and communicate that APM-specific payment message to APM provider computer program 165 via network 170. For example, the customer 130 may receive a prompt via the UWB radio 112 to provide payment information to the payment terminal 110 via the UWB radio 136 of the customer device 132.

Figure 2A:
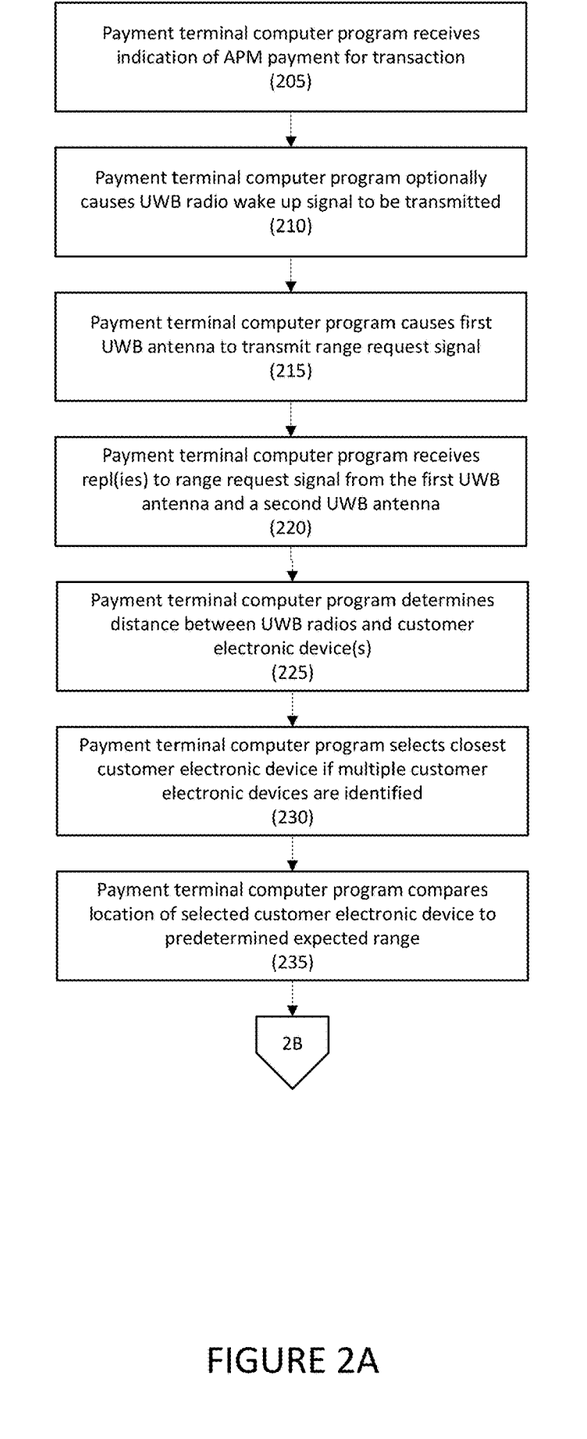
FIGS. 2A and 2B depict a method for facilitating APM payments using ultra-wideband communication from the perspective of a payment terminal according to one embodiment.
Figure 2B:
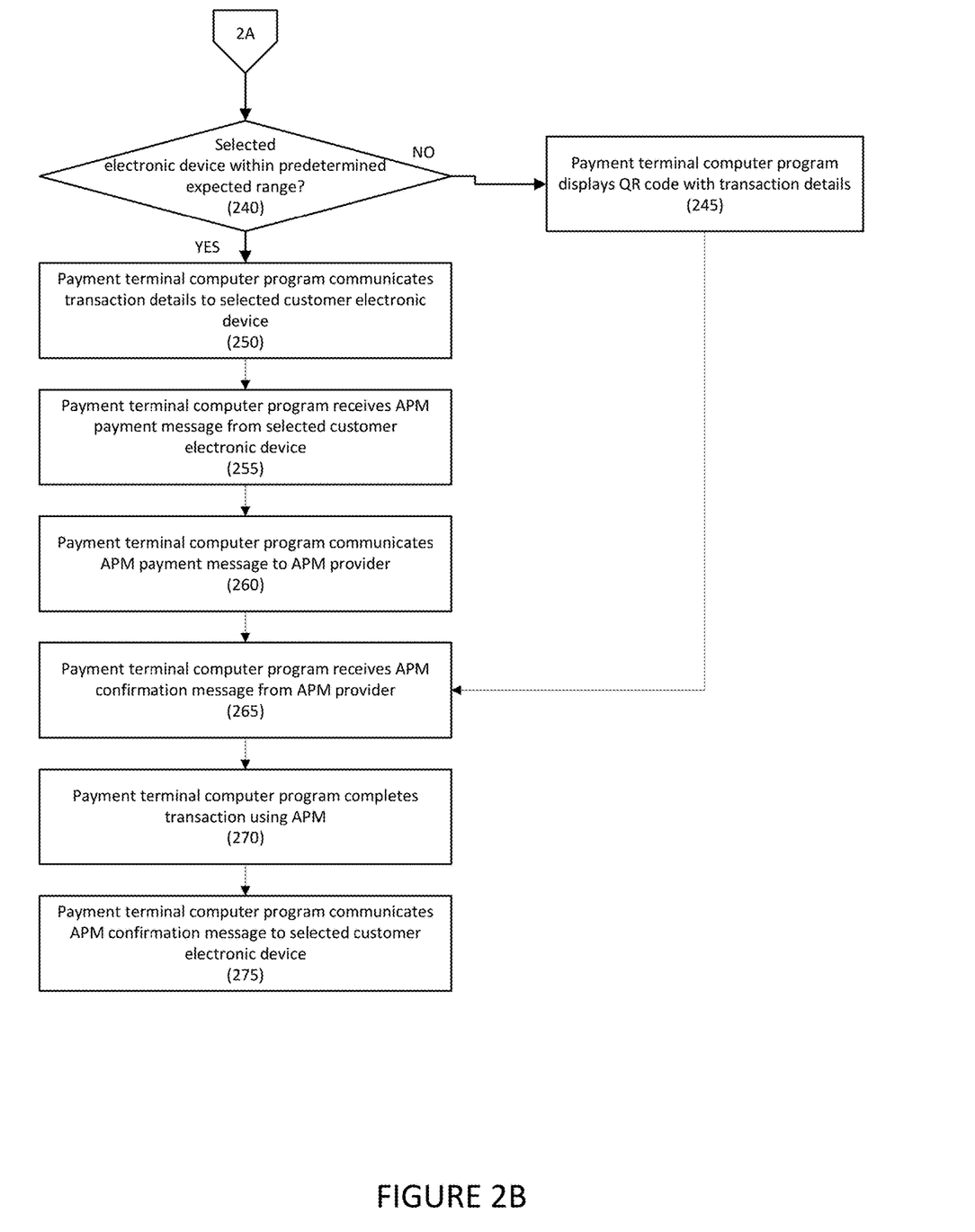

Referring to FIGS. 2A and 2B, a method for facilitating APM payments from the perspective of a payment terminal using ultra-wideband radio technology is disclosed according to one embodiment.

In step 205, a payment terminal computer program 120 executed by a payment terminal may control a payment terminal to conduct a transaction with a customer and may receive an indication from the customer that the customer will pay using an APM. In one embodiment, the customer may enter the indication at the payment terminal, or may inform the operator of the payment terminal of the desire to conduct the transaction with an APM, and the operator may enter the indication. In one embodiment, the customer may identify a specific APM.

In step 210, the payment terminal computer program 120 may optionally cause a UWB radio "wake up" signal to be transmitted. For example, at any suitable point in the transaction, the payment terminal computer program 120 may cause transmission of a RF signal that causes customer electronic devices with UWB radios receiving the signal to turn on or otherwise become active. The payment terminal computer program 120 may communicate the wake-up signal, such as a beacon frame or any other suitable signal as is necessary and/or desired.

In another embodiment, the wake-up signal may not be transmitted. Instead, the payment terminal computer program 120 may cause a display on the payment terminal to display an instruction for the customer to activate or turn on the UWB radio on the customer electronic device.

In step 215, the payment terminal computer program 120 may control the UWB radio to identify UWB-enabled customer electronic devices. In one embodiment, the payment terminal computer program 120 may control the UWB radio to transmit a range request signal from a first UWB antenna. In another embodiment, a plurality of antennas may transmit UWB signals.

In one embodiment, prior to transmitting the range request signal, the payment terminal computer program 120 may control the display to display an instruction, such as "Place your electronic device close to the screen" or similar. If the customer complies with this instruction, the probability of the correct customer electronic device being identified because the customer electronic device will most likely be the closest electronic device to the payment terminal UWB radio.

In step 220, the payment terminal computer program 120 may receive a pair of replies to the range request signal—a first reply at the first UWB antenna and a second reply at a second UWB antenna. In one embodiment, the replies may be from UWB radios on one or more customer electronic device.

In step 225, the payment terminal computer program 120 may calculate a distance from the antenna(s) and the UWB radio that provided the reply signal(s) based on the time of flight of the range request signal and the reply signal(s). In one embodiment, the time of flight calculation may be either based on the reply signal received from one antenna or a calculation based on the reply signal received at both antennas.

In one embodiment, the payment terminal computer program 120 may further use the angle of arrival for the replies to determine the positions of the customer electronic devices, such as the side of the UWB radio that the customer electronic devices are located (e.g., customer side or merchant side). For example, the angle of arrival may use one or both of time difference between the reply signals received at each antenna, and a phase difference between the signal received at each antenna.

In embodiments, the payment terminal computer program 120 may transmit multiple range request signals, and may receive multiple replies, and may determine multiple distances. The payment terminal computer program 120 may average the distances as desired.

In step 230, if more than one customer electronic device is identified, the payment terminal computer program 120 may select the customer electronic device that is closest to the UWB radio or an expected customer area, such as in front of the payment device or display, depending on the position of the UWB radio.

In step 235, the payment terminal computer program 120 may optionally compare the location of the selected customer electronic device to a predetermined expected range from the UWB radio, such as 12 inches. The predetermined expected range may be set as is necessary and/or desired in order to account for the configuration of the payment terminal, distance between a display or payment device and the UWB radio, etc. In another embodiment, the payment terminal computer program 120 may select the customer electronic device that is closest to the payment terminal.

If, in step 240, the payment terminal computer program 120 determines that the selected customer electronic device is not within the predetermined range, in step 245, the payment terminal computer program 120 may cause the display to display a machine-readable code, such as a QR code including merchant information and transaction information, that may be captured by an image capture device in the customer electronic device.

If, in step 240, the payment terminal computer program 120 determines that the selected customer electronic device is within the predetermined range, in step 250, the payment terminal computer program 120 may control the UWB radio to communicate transaction details, including merchant information, to the selected customer electronic device. If an APM provider was selected at the payment terminal, the payment terminal computer program 120 may include an identifier for an application associated with the APM provider in the communication. In another embodiment, payment terminal computer program 120 may communicate a list of the APM providers supported by the payment terminal to the selected customer electronic device.

In step 255, the payment terminal computer program 120 may receive an APM payment message from the selected customer electronic device. In one embodiment, the APM payment message may be encrypted. In one embodiment, the contents of the APM payment message and the method of encryption may depend on the protocol defined by the APM provider. In one embodiment, The APM message may include details about the transaction (e.g., transaction details received from payment terminal computer program 120 in step 240), the merchant (e.g., a merchant identifier), and/or the customer (e.g., customer account information with the APM provider). In another embodiment, the APM message may include an identifier that the APM provider may use to match the customer to the merchant and the transaction. The APM message may include an identifier for the APM provider, such as a header or other indicator.

In step 260, the payment terminal computer program 120 may communicate the APM message to the APM provider using any suitable communication network. For example, the payment terminal computer program 120 may communicate the APM message over the Internet using a network interface, a WiFi radio, a cellular radio, etc.

In step 265, the payment terminal computer program 120 may receive an APM confirmation message from the APM provider. The APM confirmation message may indicate that the APM provider has approved the transaction.

In step 270, the payment terminal computer program 120 may complete the transaction using the APM, and in step 275, may communicate the APM confirmation message to the selected customer electronic device.

Figure 3A:
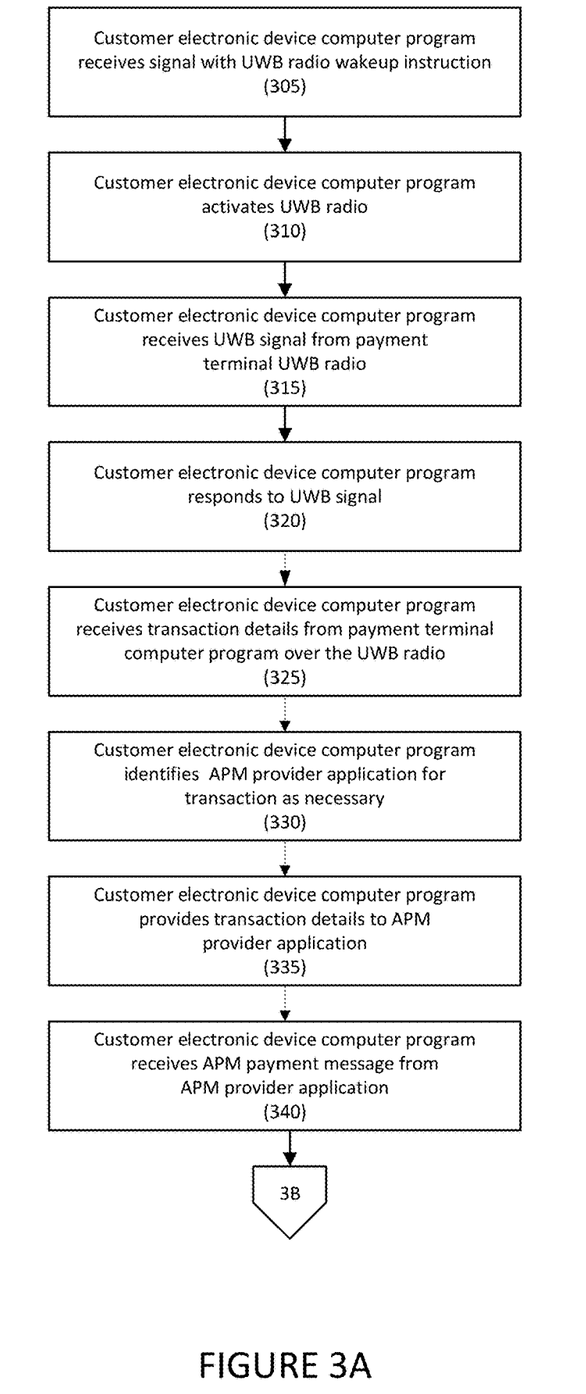
FIGS. 3A and 3B depict a method for facilitating APM payments from the perspective of a customer electronic device using ultra-wideband communication according to one embodiment.
Figure 3B:
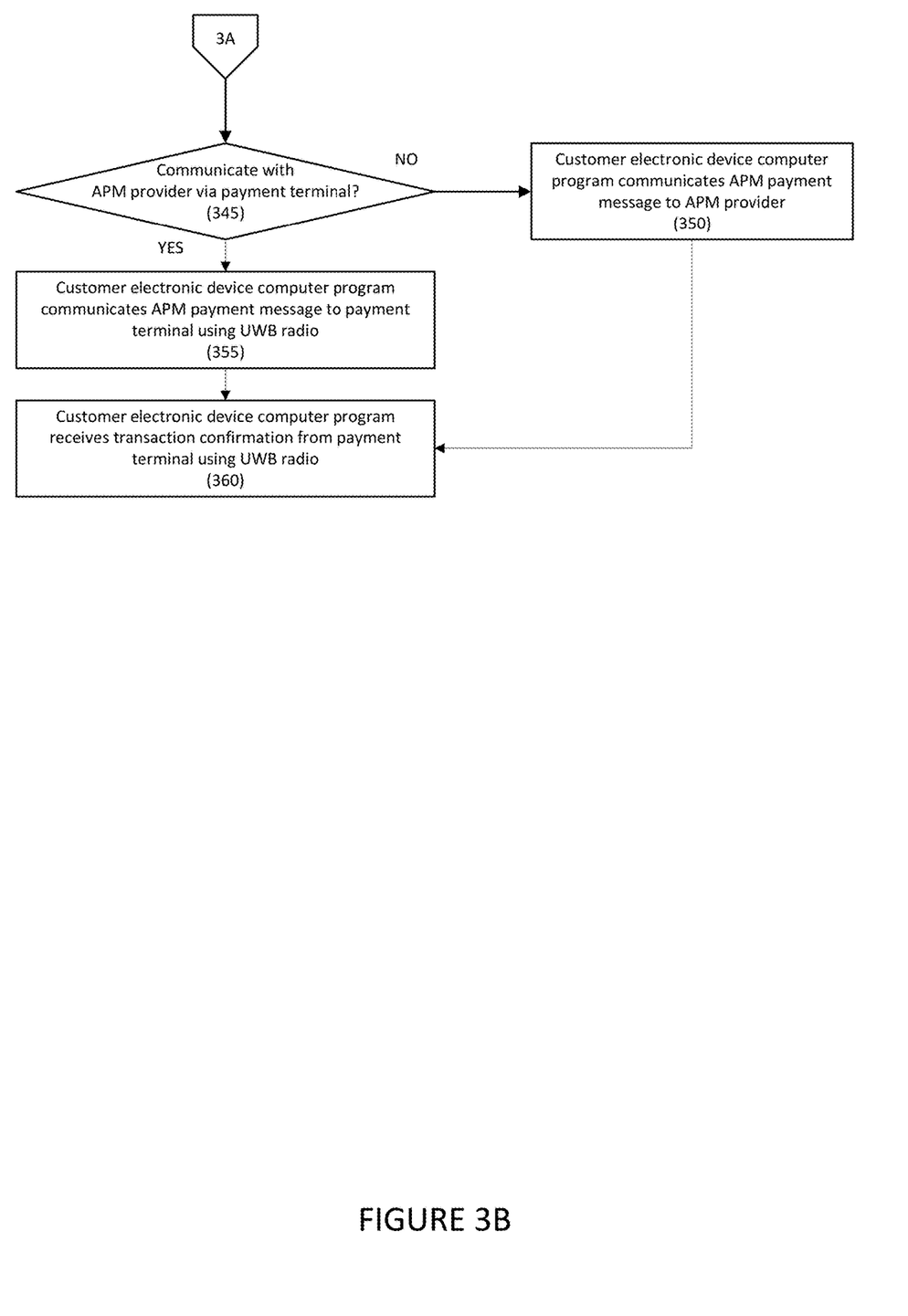

Referring to FIGS. 3A and 3B, a method for facilitating APM payments using ultra-wideband radio technology from the perspective of a customer electronic device is disclosed according to another embodiment. In step 305, an operating system on a customer electronic may optionally receive a signal with a UWB radio wake up instruction. In one embodiment, the signal may be a BLE signal, a beacon frame, etc.

In step 310, if so equipped, the customer electronic device computer program 138 or operating system may turn on or otherwise activate the UWB radio. In one embodiment, the UWB radio may be turned on or otherwise activated in response to the wake-up signal, the UWB radio may be manually turned on or activated, etc.

In step 315, the customer electronic device computer program 138 may receive a UWB signal, such as a range request signal, from a UWB radio transmitter associated with a payment terminal, and, in step 320, the customer electronic device computer program 138 may cause the UWB radio on the customer electronic device to reply to the UWB signal.

In step 325, the customer electronic device computer program 138 may receive transaction details from the payment terminal computer program 120 over the UWB radio. In one embodiment, the transaction details may include transaction information, a merchant identifier, and a payment terminal identifier. In one embodiment, the transaction details may further identify an APM provider for the transaction.

In step 330, if necessary, the customer electronic device computer program 138 may identify the appropriate APM provider application for the transaction. In one embodiment, the customer electronic device computer program 138 may select the appropriate APM provider application based on a default APM provider application, using a hierarchy of APM provider applications, by applying one or more rules, by asking the customer to identify the desired APM provider application, or selecting the APM provider application based on an APM provider identification in the communication from the payment terminal computer program 120.

For example, instead of receiving an identification of an APM provider for the transaction from the payment terminal computer program 120, the transaction details may include a list of the APM providers supported by the payment terminal. The customer electronic device computer program 138 may compare the list of supported APM providers by the payment terminal to the APM provider applications installed on the customer electronic device, and may present the results to the customer for selection. In another embodiment, the customer electronic device computer program 138 may apply a rule to select the APM provider based on, for example, transaction details, the merchant, etc.

In step 335, the customer electronic device computer program 138 may provide the transaction details received from the payment terminal computer program 120 to the appropriate APM provider application.

In step 340, the customer electronic device computer program 138 may receive an APM payment message from the APM provider application. In one embodiment, the APM payment message may include an identifier for an account and/or a customer identifier for the customer with the APM provider, the transaction information, and the merchant information. For example, the information included in the APM payment message may include the same information that may be included in a QR code generated by the APM provider application. In one embodiment, the APM payment message may also include a header or other identifier that identifies the APM provider.

In step 345, the customer electronic device computer program 138 may communicate the APM payment message to the APM provider directly or via the payment terminal. The determination may be based on a rule or customer preference. For example, if a communication network is not available to the customer electronic device, has poor coverage, etc. the customer electronic device computer program 138 may select to communicate the APM payment message to the APM provider via the payment terminal.

If the customer electronic device computer program 138 selects providing the APM payment message to the APM provider directly, in step 350, the customer electronic device computer program 138 may communicate the APM payment message to the APM provider using an available communication network.

If the customer electronic device computer program 138 selects providing the APM payment message to the APM provider via the payment terminal, in step 355, the customer electronic device computer program 138 may communicate the APM payment message to the payment terminal using the UWB radio.

In step 360, the customer electronic device computer program 138 may receive a transaction confirmation from the payment terminal over the UWB radio.

It will be appreciated by persons skilled in the art that the present invention is not limited by what has been particularly shown and described hereinabove. Rather, the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for facilitating an Alternate Payment Mechanism ("APM") payment transaction using ultra-wideband ("UWB") radio technology, the method comprising:
    causing, by a payment terminal computer program executed by a processor of a payment terminal, a payment terminal UWB radio to transmit a range request signal from a first antenna;

receiving, by the payment terminal computer program and from each of one or more customer electronic devices comprising customer electronic device UWB radios, a pair of replies to the range request signal, the pair of replies comprising a first reply signal received at the first antenna and a second reply signal received at a second antenna; and determining, by the payment terminal computer program, a distance between the payment terminal UWB radio and each customer electronic device based on a time of flight for the range request signal and the pair of reply signals;

selecting, by the payment terminal computer program, a customer electronic device from a plurality of customer electronic devices, wherein the selected customer electronic device is selected to conduct the payment transaction with the payment terminal, wherein the selected customer electronic device is selected from the plurality of customer electronic devices upon determining that the selected customer electronic device is within a predetermined distance of the payment terminal UWB radio and has the distance that is closest to the payment terminal UWB radio;

communicating, by the payment terminal computer program via the payment terminal UWB radio, to the selected customer electronic device, payment transaction details for the payment transaction, the payment transaction details comprising a merchant identifier and a transaction amount;

receiving, by the payment terminal computer program and from the selected customer electronic device via the payment terminal UWB radio, an APM payment message for an APM payment provider, the APM payment message comprising customer account information with the APM provider, wherein the APM payment message is encrypted and is received with an identifier for the APM payment provider;

communicating, by the payment terminal computer program, the APM payment message to the APM payment provider, wherein the APM payment provider is configured to decision the payment transaction based on the APM payment message; and receiving, by the payment terminal computer program and from the APM payment provider, a payment confirmation for the payment transaction.

2. The method of claim 1, further comprising:
causing, by the payment terminal computer program, a wake-up signal to be transmitted, wherein the wake-up signal causes the customer electronic device UWB radios on the one or more customer electronic devices to be activated.

3. The method of claim 1, further comprising:
communicating, by the payment terminal computer program and using the payment terminal UWB radio, the transaction confirmation to the selected customer electronic device.

4. The method of claim 1, wherein the identifier for the APM payment provider is in a message header.

5. A payment terminal device, comprising:
a memory comprising a payment terminal computer program;
a processor configured to execute the payment terminal computer program; and
a payment terminal device ultra-wideband ("UWB") radio comprising a plurality of antennas;
wherein the payment terminal computer program is configured to:

cause the payment terminal device UWB radio to transmit a range request signal from a first antenna of the plurality of antennas;

receive from each of one or more customer electronic devices, each customer electronic device comprising a customer electronic device UWB radio, a pair of replies to the range request signal, the pair of replies comprising a first reply signal received at the first antenna and a second reply signal received at a second antenna of the plurality of antennas; and determine a distance between the payment terminal device UWB radio and each of the one or more customer electronic devices based on a time of flight for the range request signal and the pair of reply signals;

select a customer electronic device from the one or more customer electronic devices with which to conduct a transaction with the payment terminal device, wherein the selected customer device is selected from the plurality of customer electronic devices upon determining that the selected customer electronic device is within a predetermined distance of the payment terminal UWB radio and has the distance that is closest to the payment terminal device UWB radio;

communicate payment transaction details for the transaction comprising a merchant identifier and transaction information to the selected customer electronic device using the payment terminal device UWB radio;

receive an Alternate Payment Mechanism ("APM") payment message from the selected customer electronic device for an APM payment provider, the APM payment message comprising customer account information with the APM provider, wherein the APM payment message is encrypted and is received with an identifier for the APM payment provider;

communicate the APM payment message to the APM payment provider, wherein the APM payment provider is configured to decision the transaction based on the APM payment message; and receive a transaction confirmation from the APM payment provider.

6. The payment terminal device of claim 5, wherein the payment terminal computer program is further configured to cause a wake-up signal to be transmitted, wherein the wake-up signal causes the customer electronic device UWB radios on the one or more customer electronic devices to be activated.

7. The payment terminal device of claim 5, wherein the payment terminal computer program is further configured to communicate the transaction confirmation to the selected customer electronic device using the payment terminal device UWB radio.

8. The payment terminal device of claim 5, wherein the identifier for the APM payment provider is in a message header.

9. An electronic device, comprising:
a memory;
a computer processor; and
an electronic device ultra-wideband ("UWB") radio;
wherein the electronic device is configured to:
receive, by the electronic device UWB radio and from a payment terminal, a range request signal;

communicate, by the electronic device UWB radio, a reply to the payment terminal in response to receiving the range request signal;

receive, by the electronic device UWB radio, transaction details for a transaction comprising a merchant identifier and transaction information;

communicate, by the electronic device UWB radio, an encrypted Alternate Payment Mechanism ("APM") payment message for an APM provider, the APM payment message comprising customer account information with the APM provider and an identifier for an APM payment provider, wherein the APM payment provider is configured to decrypt the encrypted APM payment message and decision the transaction based on the APM payment message; and receive a transaction confirmation from the APM provider.

10. The electronic device of claim 9, wherein the identifier is in a message header.

* * * * *